United States Patent Office 3,694,390
Patented Sept. 26, 1972

3,694,390
EPOXIDIZED POLYAMIDE RESIN FORMING STABLE AQUEOUS SOLUTIONS OF HIGH CONCENTRATION
Alfred Edwards Winslow, 60 Main St., Unadilla, Otsego, N.Y. 13849
No Drawing. Original application Apr. 25, 1969, Ser. No. 819,493. Divided and this application Mar. 30, 1970, Ser. No. 29,323
Int. Cl. C08g 20/38
U.S. Cl. 260—29.1 R
12 Claims

ABSTRACT OF THE DISCLOSURE

This invention relates to a curable low molecular weight cationic epoxidized polyamide, stably dispersible in water at high concentration and low viscosity and in particular to a method of preparing said polyamide comprising reacting a cyclic polycarboxylic acid first with from about 1.8 to about 4.0 molar equivalents of a polyalkylene polyamine and then with between about 3.5 and about 16 molar equivalents of an epoxy compound. The invention relates also to a starch dispersion comprising minor quantities of said epoxidized polyamide and to a method of improving the dry strength of paper by incorporating said starch dispersion in the fibrous pulp or web.

---

This is a division of application Ser. No. 819,493 filed Apr. 25, 1969, now abandoned.

BACKGROUND OF THE INVENTION

Epoxidized polyamides are formed by first reacting a polycarboxylic acid with a polyalkylene polyamine to form the polyamide and then epoxidizing said polyamide in a solvent. However, the epoxidation of polyamides formed with cyclic polycarboxylic acids has not been entirely successful. Such polyamides have limited solubility for the solvent used in the epoxidation, making epoxidation inefficient and difficult and being in constant danger of sudden conversion to an insoluble mass, and furthermore, resulting in products of limited storage stability.

As disclosed in copending application Ser. No. 583,460, filed Sept. 30, 1966 now abandoned and in continuation application Ser. No. 843,856 filed July 22, 1969, now Patent No. 3,584,072 issued June 8, 1971, some improvement has been made in overcoming difficulties due to solubility during epoxidation, namely, by reacting the intermediate polyamide with an epoxy compound in the presence of added water-soluble acid, such as formic acid. However, these products have high viscosity and do not maintain stability during storage unless they are subsequently highly diluted with water and consequently still have the disadvantage of high costs for transportation and storage.

In short, there is no previously disclosed procedure for preparing an epoxidized polyamide from cyclic polycarboxylic acids which may be carried out efficiently at high concentration to give low-viscosity products remaining stable for long periods of storage without dilution.

SUMMARY OF THE INVENTION

An efficient means has now been found for preparing a curable epoxidized polyamide from a cyclic polycarboxylic acid at high concentration to yield a product which has low viscosity and excellent storage stability at high concentration, and which, furthermore, is useful as an additive to starch in promoting dry strength of paper.

Briefly stated, the present invention comprises reacting a cyclic polycarboxylic acid with from about 1.8 to about 4.0 molar equivalents of a polyalkylene polyamine and reacting the resultant resinous polyamide product with between about 3.5 and about 16.0 molar equivalents of an epoxy compound. It has been surprisingly found that the epoxidation step of said method can be carried out without customary danger of sudden conversion into an insoluble mass and that the resultant epoxidized product may be allowed to remain concentrated at up to about 80% solids without phase separation or gelation over a period of up to longer than one year.

The instant invention also comprises a starch dispersion containing minor quantities of said epoxidized polyamide, a method for improving the dry strength of paper comprising incorporation of said starch dispersion in the fibrous pulp or web used to make the paper.

DETAILED DESCRIPTION

The method of the instant invention differs significantly from previously disclosed epoxidized polyamides in the respective amounts of polyalkylene polyamine and epoxidizing agent used with a given amount of polycarboxylic acid. In the first place, the polyamide polyamine intermediate is formed by reacting the polycarboxylic acid with a much higher proportion of polyalkylene polyamine than is customarily used to make polyamide intermediates for epoxidation. The resultant low molecular weight intermediate has a low viscosity at high concentrations up to about 80% by weight, and unexpectedly permits epoxidation to be carried out smoothly without the usual high degree of dilution. In the second place the proportion of epoxy compound subsequently used is again much higher than customary.

The reasons for the exceptional physical stability of the highly concentrated (up to 80% by weight dry solids) epoxidized products of this invention are not completely understood. The higher proportions of hydrophilic groups provided by both alkylene amide and epoxy compound are probably contributing factors. In addition, it was not predictable that the new stable form of epoxidized polyamide made with said higher proportions of both polyalkylene polyamine and epoxy compound is satisfactory as a paper additive, particularly when added in small amounts in conjunction with starch to fibrous pulp to effect an increase in the dry strength paper made therefrom.

As to materials, the cyclic carboxylic acid used is preferably an aromatic carboxylic acid such as isophthalic acid, terephthalic acid and hydrogenated derivatives of phthalic acid including tetrahydrophthalic and hexahydrophthalic acids. Other suitable aromatic acids are diphenic acid, 4,4'-diphenyl dicarboxylic acid, 4,4' - sulfonyl dibenzoic acid; oxydibenzoic, phenylindane dicarboxylic, 2,5-thiophene dicarboxylic, phenylenediacetic, and homophthalic acids and hydrogenated derivatives of such homophthalic acids. Relatively small amounts of aromatic acids such as trimellitic, pyromellitic, and other acids having more than two carboxy groups, or their anhydrides, can be used with the above acids to provide chain branching in the polyamide.

The polyalkylene polyamine used may be selected singly or in combination from those having two primary amino groups and at least one amino group which is either secondary or tertiary, i.e., the polyalkylene polyamine of this invention has the generic formula:

where R is either alkyl, aminoalkyl or hydrogen ($x$ may vary from 0 to about 5 and $n$ may vary from 2 to about 6). Among the commercially available amines which belong in this class are diethylene triamine, triethylene tetramine, tetraethylene pentamine, dipropylene triamine, 4- alkyldiethylenetriamine, 5 - alkyldipropylenetriamine, 4,7-dialkyltriethylenetetramine, and dihexylene triamine.

The condensation of cyclic polycarboxylic acid and polyalkylene polyamine is carried out by heating until essentially the theoretical amount of water is formed and liberated, as determined either by direct measurement of the volume or weight of the collected water or by secondary standards such as viscosity which may be established for specific combinations of reactants. Temperatures for condensation are characteristically between about 100° C. and about 260° C. for a period between about 0.5 to 20 hours.

The molar ratio of polyamine to polycarboxylic acid may be between about 1.8/1 and about 4.0/1. The preferred ratio is between about 2.0/1 and about 2.4/1. In addition to the polyamine and polycarboxylic acid reactants, the resin cook may contain minor amounts of various modifying agents such as urea, melamine, lactams, amino acids, variously mixed aliphatic-aromatic-carboxylic diamines and other polyamines having higher functional groups; also minor amounts of substituted carboxylic acids including oxydipropionic acid, thiodipropionic acid and nitrilotriacetic acid.

Whle direct condensation of a polycarboxylic acid and a polyalkylene polyamine is the preferred means for preparing the polyamide polyamine of the instant invention, alternative methods known to the synthetic chemist may be used. For example, in place of the free carboxy-acid there may be use a corresponding carbonyl compound such as an acid halide, an ester, particularly a methyl ester, an ammonia-derived amide as well as an anhydride where appropriate. Also, the diprimary amine may, for example, be used in the form of a carbonate. In such alternative methods, the molar ratio of polyamine to carbonyl moiety would be the same as in the corresponding direct condensation of polyamine with parent acid.

According to the instant invention, the intermediate product comprising the low molecular weight polyamide polyamine is then reacted with an epoxy compound. Such compound may be any compound containing an oxirane ring and also a moiety reactive with amine groups. Epichlorohydrin is preferred. Other epihalohydrins such as epibromohydrin and epiiodohydrin can also be used. Also operative are the epihalohydrin-forming compounds such as dichlorohydrin and dibromohydrin.

As to amounts, the epoxy compound used may be between 3.5 and 16 molar equivalents, based on the initial polycarboxylic acid, the preferred amount being in the range between about 5 and about 8 molar equivalents.

Epoxidation is carried out in a solvent. The solvent can be water and organic solvents such as methanol, ethanol, propanol, butanol, isobutanol, pentanol, isopropanol ethylene glycol, other lower alcohols, glycol ethers or mixtures thereof. It is preferred to use a mixture of methanol and water. For best results as to obtaining smooth condensation during the epoxidation step, the epoxidation reaction mixture should be maintained at a temperature substantially not exceeding about 100° C. When the aforementioned preferred materials are used it is preferred to keep this temperature between about 40° C. to about 60° C. for smoothest condensation results.

Using the aforestated conditions, it has been found possible in many instances to obtain stable end-products of concentrations equal to as high as 80% solids on a weight basis. However, the optimum range of concentration providing the desired balance of properties, including viscosity, depends upon the particular species of polycarboxylic acid and polyalkylene polyamine being used. In extreme cases such as when relatively insoluble reactants like oxydibenzoic acids are used, the obtainable concentrations may be limited to as low as 25% solids. While even this represents an improvement over the concentrations obtainable with such reactants using the prior art, solubility of the end-product may be improved still further by combining the procedure of the instant invention with the procedure of copending application Ser. No. 583,460 namely, by admixing the epoxidation mixture with a water-soluble acid in the proportion of about .04 to about 1 mole per mole of secondary amine in said intermediate polyamide product as shown in the generic formula given on page 1, line 66. As disclosed in said copending application the water-soluble acid used can be either organic or inorganic. Examples are formic acid, acetic acid, glycolic acid, lactic acid, malic acid, sulfuric acid and hydrochloric acid. Of these formic acid is preferred. The water-soluble acid is added preferably at the beginning of the epoxidation reaction, although it may be added after reaction has been initiated.

The usefulness of the epoxidized product of the instant invention is illustrated in Examples 5, 6, 7 and 8 below. Between 2 and 15 parts of said product may be added to 100 parts by weight of a starch such as tapioca, potato or corn starch or modification and mixtures thereof and an aqueous solution or dispersion prepared therefrom. Alternatively, an aqueous starch solution or paste may first be prepared and then admixed with sufficient of the epoxidized product of this invention to correspond to between 2 and 15 parts of solid epoxidized product per 100 parts of starch. The resin-treated starch dispersion is added to a slurry of fibrous pulp in the amount of between 0.5 and 7% solids by weight on basis of bone-dry weight of said pulp and contributes to the dry strength of paper made from said pulp. If desired, various fillers may at the same time be incorporated by wet and addition into the paper.

This invention will be further illustrated by description in connection with the following examples of the practice of it. In these examples and elsewhere herein, the proportions are expressed as parts by weight except where specifically stated to the contrary.

Example 1

To a vessel equipped for heating and removal of water by distillation were added 420.8 parts by weight of mixed ethyleneamines (a commercially available grade containing approximately 35% diethylenetriamine and 65% triethylenetetramine), and the temperature was raised to 95° C. To the amines were added 249.2 parts of a commercial grade of isophthalic acid (containing at least 95% isophthalic acid, the remaining constituents being largely terephthalic acid) during a period of six minutes with good agitation. This corresponds to an estimated molar ratio of 2.2 moles of amines per mole of acid. A homogeneous solution resulted after continued heating and stirring. Condensation during a 3.1 hour period at a temperature of 179–195° C. produced 70 parts of distillate was facilitated by use of a cold condenser to return to the reaction vessel and redistilled. Return of the distillate was facilitated by use of a cold coindenser to return reflux to the reaction vessel. The second distillation during an equal time period at a temperature of 135° to 207° C. followed by 2.75 hours at a constant temperature of 207° C. produced 69 parts of final distillate. The product resin was dissolved while still hot with 80 parts of water followed by 120 parts of methanol, again using a refluxing condenser to help cool the product solution. Actual composition was estimated as 75% resin, 10% water and 15% methanol. A solids determination at 135° C. gave a value of 63%, indicating the presence of some volatile products. The product solution, amounting to 789 parts, has a Brookfield viscosity at 25.0° C. of 1780 cps. (Model LVF, Spindle No. 2, 12 r.p.m.). Loss of amine to the distillate was reduced from 5.6% to 3.3% of the amine charge weight by redistillation, as indicated by Kjeldahl nitrogen determinations. The product solution has a Gardner color value of 6, a specific gravity determined at 25° C. of 1.100 and a pH of 12.1. It is a base resin intermediate for subsequent reaction.

Example 2

To 400 parts of the base resin intermediate solution prepared as in Example 1 and diluted with 595 parts of additional water in a stirred reaction vessel were added 435 parts of epichlorohydrin during a period of 22 minutes. The temperature, initially at 42° C., was gradually cooled to 39° C. during the addition period by external cooling. It was then allowed to rise slowly during the next 36 minutes to 60° C. and held at this temperature for 67 minutes. The viscosity of the solution at the reaction temperature during the last hour was about 20 cps. as measured by a Brookfield viscometer (60 r.p.m.). The product at 25° C. has a viscosity of 54 cps., and a pH of 6.9. It is clear, light yellow and infinitely dilutable with water. It has a Gardner color value between 4 and 5, and a solid content of 50.0%. It can be stored at an elevated temperature of 145° F. for more than 35 days without gelling; similarly at 110° F. and aging sample increased in viscosity only moderately and was still completely water-soluble after four months. The bulk material after storage at ambient temperatures for 15 months reached a viscosity of only 1440 cps.

Example 3

An aliquot of the base resin intermediate prepared as in Example 1, corresponding to 285 parts by weight was diluted with 424 parts of additional water in a stirred reaction vessel there were then added 310 parts of epichlorohydrin during a period of 66 minutes; the ratio of epichlorohydrin to base resin intermediate solids being the same as in Example 2. The temperature, initially at 30° C., was held to a maximum of 48° C. at the end of this period by external cooling with cold water. Temperature was then allowed to rise to 60° C. during 41 minutes and held at 60° C. for 65 minutes. The viscosity of the reaction mixture before cooling was 23 cps. The product at 25° C. had a viscosity of 64 cps., a pH of 7.1, and a determined solids content of 48.9%. It is a clear, light yellow solution of infinite water dilutability. It has a useful life of about 8 days at 145° F. before it becomes a thin gel. An aging sample at 110° F. shows a liquid storage life of 22 days.

Example 4

A portion corresponding to 132 parts by weight of an intermediate prepared as in Example 1 was diluted with 300 grams of methanol in a stirred reaction vessel. There were then added 168 parts of epichlorohydrin during a period of 15 minutes. The temperature initially at 39° C. was held between 35 and 43° C. during the addition period. During the next 27 minutes the temperature was allowed to rise to 60° C. and was held at 58 to 60° C. for 2.2 hours. The viscosity of the reaction medium at 60° C. rose from 10 to 18 cps., during the period. The product at 25° C. has a Brookfield viscosity of 78 cps. (Model HBT, Spindle No. 1; 100 r.p.m.), and a pH of 7.8. Dilution with an equal part of water produces a white turbidity when initially tested which disappears upon mixing with additional water. The product is a bright, clear, light yellow solution, with determined solids content of 50.8% (105° C.). Reactivity of the product is illustrated by cross-linking and gelation of the solution when held at 110° F. for less than 16 hours. A liquid life at ambient temperatures of less than 3 days was considerably extended by dilution of the product solution with water to a solids level at 30%.

Example 5

A 1% dispersion of tapioca starch in water was cooked at 100° C. for one hour, and sufficient of the resin solution prepared as in Example 2, excepting 2.1 moles of amines per mole of acid was used to make the base resin intermediate, was added to correspond to 0.06 part of resin solids.

A 0.25% slurry of bleached sulfite pulp was prepared after adjustment to a Canadian Standard Freeness of 460 at a consistency of 1.0%. Sufficient of the tapioca starch-resin dispersion was added to a portion of the pump slurry (adjusted to pH 8 which sodium bicarbonate) to correspond to a level of 1.06% starch-resin solids based on pulp solids. Four handsheets (8 x 8 in.) made with 2.5 grams pulp per sheet (bone-dry basis) on a Noble and Wood sheet machine were drum-dried to 3% moisture to simulate off-machine conditions. Three sample strips from each sheet were subsequently dried at 220° F. for an hour to represent maximum cure. All samples were conditioned overnight at 50% R.H. and 73° F. before testing.

Averaging three measurements for each four handsheets, the machine cured sheets had an average tensile strength equal to 10.4 lbs. per 15 mm. width and a Mullen burst strength of 26.6 p.s.i.; the oven-cured sheets had a tensile strength equal to 11.1 lbs. per 15 mm. width. These results are significantly higher than results obtained on corresponding handsheets made in the absence of the starch-resin treatment of this invention which gave average values of only respectively 8.7 lbs. per 15 mm. width tensile strength and 17.7 p.s.i. Mullen burst strength for machine-cured sheets, 9.4 lbs. per 15 mm. width for oven-cured sheets.

Example 6

A preblend was prepared of 100 parts tapioca starch and 6 parts, on a dry solids basis, of the resin solution of Example 5. A 1.6% dispersion, on a solids basis, of this preblend in water was cooked at 100° C. for 1 hours. Part of the 0.25% pulp slurry of Example 5 was then treated with this starch-resin dispersion in amount corresponding to 1% by weight on a dry solids basis. This treated pulp slurry was used to make handsheets according to Example 5. After overnight conditioning, tests resuts averaged 10 lbs. per 15 mm. width tensile strength and 26.0 p.s.i. Mullen burst strength for machine-cured sheets, and respectively 10.8 lbs. tensile strength for oven-cured sheets.

Example 7

The procedure of Example 5 was repeated except that potato starch was used instead of tapioca starch. The resulting average strengths were 10.3 lbs. per 15 mm. width tensile strength, and 26.9 p.s.i. Mullen burst strength for machine-cured sheets, and 11.3 lbs. per 15 mm. width tensile strength for oven-cured sheets.

Example 8

The procedure of Example 5 was repeated except that partially hydrolized cornstarch was used. The resulting average strength were 9.1 lbs. per 15 mm. width tensile strength and 20.8 p.s.i. Mullen burst strength for machine cured sheets and 9.6 lbs. per 15 mm. width tensile strength for oven-cured sheets.

Example 9

The procedure of Example 1 is followed excepting that the isophthalic acid is replaced by an equimolar quantity of oxydibenzoic acid, the intermediate resin is dissolved to form a 60% solids solution by heating and stirring with a mixture of two parts of water and three parts of methanol containing 0.2 mole formic acid per mole of secondary amine groups in the resin. The partially acidified solution is epoxidized according to the procedure of Example 2, diluting with enough more water to form 45% solution. The product solution has satisfactory stability.

Example 10

The procedure of Example 1 is followed excepting that the isophthalic acid is replaced successively by an equimolar quantity of tetrahydrophthalic acid, hexahydrophthalic acid, diphenic acid, 4,4'-diphenyl dicarboxylic acid, 4,4'-sulfonyl dibenzoic acid, oxydibenzoic acid, phenylindane dicarboxylic acid, 2,5-thiophene dicarboxylic acid, phenylenediacetic acid, and homophthalic acid. In every case the epoxidized solution has satisfactory stability in the concentration range 45% to 60% and in some cases higher.

It will be understood that it is intended to cover all changes and modifications of the examples of the invention herein chosen for the purpose of illustration which do not constitute departures from the spirit and scope of the invention.

What is claimed is:

1. In the preparation of an epoxidized polyamide solution which preparation consists essentially of the steps of (a) reacting at a temperature between about 100° C. and about 260° C. for a period between about 0.5 to 20 hours a cyclic carboxylic polycarboxylic acid with a polyalkylene polyamine having the formula $$H_2NC_nH_{2n}(NRC_nCH_{2n})_xNH_2$$

where R is alkyl, aminoalkyl or hydrogen, $x$ is 0–5 and $n$ is 2–6, to form a polyamide, and (b) epoxidizing said polyamide with an epoxy compound selected from epichlorohydrin, epibromohydrin and epiiodohydrin in the presence of a solvent selected from the group consisting of water and lower alcohols, the improvement consisting of (i) using in (a) from 2.0 to about 2.5 moles of polyalkylene polyamine per mole of polycarboxylic acid and (ii) using between about 3.5 and 16 moles of epoxy compound per mole of polycarboxylic acid.

2. The improvement of claim 1 wherein the epoxy compound is epichlorohydrin used in amount from 5 to 8 moles per mole of acid.

3. The improvement of claim 2, wherein the cyclic polycarboxylic acid is selected from the group consisting of isophthalic acid, terephthalic acid, tetrahydrophthalic acid, hexahydophthalic acid, diphenic acid, 4,4'-diphenyl dicarboxylic acid, 4,4'-sulfonyl dibenzoic acid, oxydibenzoic acid, phenylindane dicarboxylic acid, 2,5-thiophene dicarboxylic acid, phenylene diacetic acid and homophthalic acid, and mixtures thereof; the polyalkylene polyamine is selected from the group consisting of diethylenetriamine, triethylenetetramine and mixtures thereof.

4. The improvement of claim 2 wherein the acid is isophthalic acid.

5. The improvement of claim 2 wherein the acid is terephthalic acid.

6. The improvement of claim 2 wherein the polyalkylene polyamine is selected from the group consisting of diethylenetriamine, triethylene tetramine and mixtures thereof.

7. As an article of commerce, a solution consisting essentially of between about 45% and about 55% by weight of an epoxidized polyamide prepared by a method using the improvement of claim 1.

8. As an article of commerce, a solution consisting essentially of between about 45% and about 55% by weight of an epoxidized polyamide prepared by a method using the improvement of claim 2.

9. As an article of commerce, a solution consisting essentially of between about 45% and about 55% by weight of an epoxidized polyamide prepared by a method using the improvement of claim 3.

10. As an article of commerce, a solution consisting essentially of between about 45% and about 55% by weight of an epoxidized polyamide prepared by a method using the improvement of claim 4.

11. As an article of commerce, a solution consisting essentially of between about 45% and about 55% by weight of an epoxidized polyamide prepared by a method using the improvement of claim 5.

12. As an article of commerce, a solution consisting essentially of between about 45% and about 55% by weight of an epoxidized polyamide prepared by a method using the improvement of claim 6.

References Cited

UNITED STATES PATENTS

| | | | |
|---|---|---|---|
| 2,970,971 | 2/1961 | Katz et al. | 260—78 SC |
| 3,125,552 | 3/1964 | Loshaek et al. | 260—78 SC |
| 3,239,491 | 3/1966 | Tsou et al. | 260—78 SC |
| 3,250,664 | 5/1966 | Conte et al. | 260—78 SC |
| 3,329,657 | 7/1967 | Strazdins et al. | 260—78 SC |
| 3,434,984 | 3/1969 | Hyland | 260—78 SC |
| 3,395,130 | 7/1968 | Barrett et al. | 260—78 SC |
| 3,224,986 | 12/1965 | Butler et al. | 260—78 SC |
| 2,926,154 | 2/1960 | Keim | 260—78 SC |
| 3,584,072 | 6/1971 | Winslow | 260—78 SC |

HAROLD D. ANDERSON, Primary Examiner

U.S. Cl. X.R.

162—164; 260—29.2 N, 9, 47 CZ, 78 SC

UNITED STATES PATENT OFFICE
CERTIFICATE OF CORRECTION

Patent No. 3,694,390      Dated Sept. 26, 1972

Inventor(s) Alfred Edwards Winslow

It is certified that error appears in the above-identified patent and that said Letters Patent are hereby corrected as shown below:

Column 1, line 6, after "13849" insert --assignor to Borden, Inc., New York, N. Y. --.

Column 3, line 24 "whle" should be --while--.

Column 4, delete completely lines 54, 55 and 56 "late was facilitated....coindenser to return" and replace by --late. After moderate cooling the distillate was returned to the reaction vessel and redistilled. Return of the distillate was facilitated by use of a cold condenser to return--.

Column 4, line 64 "refluxing" should be --reflux--.

Column 5, line 32 between "48°C" and "at" insert --and reduced to 40°C--.

Column 6, line 36 "resuts" should be --results--.

Signed and sealed this 8th day of May 1973.

(SEAL)
Attest:

EDWARD M. FLETCHER, JR.
Attesting Officer

ROBERT GOTTSCHALK
Commissioner of Patents